United States Patent
Ross et al.

[11] Patent Number: 6,142,021
[45] Date of Patent: Nov. 7, 2000

[54] SELECTABLE PRESSURE SENSOR

[75] Inventors: Carl Ross, Mundelein; Walter Czarnocki, Hoffman Estates; John Schuster, Grayslake; Xiaoyi Ding, Lake Zurich, all of Ill.

[73] Assignee: Motorola, Inc., Schaumburg, Ill.

[21] Appl. No.: 09/137,765

[22] Filed: Aug. 21, 1998

[51] Int. Cl.$^7$ .................................................. G01L 9/06
[52] U.S. Cl. ................................................................ 73/727
[58] Field of Search .............................. 73/720, 721, 722, 73/723, 724, 725, 726, 727; 338/2, 4, 42; 357/26, 40, 51, 55

[56] References Cited

U.S. PATENT DOCUMENTS

| | | |
|---|---|---|
| 4,322,980 | 4/1982 | Suzuki et al. . |
| 4,539,554 | 9/1985 | Jarvis et al. . |
| 4,885,621 | 12/1989 | Yoder et al. . |
| 4,996,082 | 2/1991 | Guckel et al. . |
| 5,220,838 | 6/1993 | Fung et al. . |
| 5,264,075 | 11/1993 | Zanini-Fisher et al. . |
| 5,531,121 | 7/1996 | Sparks et al. . |

*Primary Examiner*—William Oen
*Attorney, Agent, or Firm*—Michael L. Stolarski; Nicholas C. Hopman; John J. King

[57] ABSTRACT

A sensor (10) includes a plurality of sensing elements (14–20) deposed on a sensor substrate (12) and an electronic switching circuit (22) electrically connected to each of the sensing elements (14–20) for electrically selecting at least one of the sensing elements (14–20).

11 Claims, 5 Drawing Sheets

SELECTABLE PRESSURE SENSOR

FIELD OF THE INVENTION

The present invention relates to a pressure sensor. More particularly, the present invention is directed to providing a monolithic sensor having multiple sensing elements on a single substrate and electrically selecting one of the sensing elements.

BACKGROUND OF THE INVENTION

Diaphragm Thickness Control

Etching a sensor diaphragm to a desired thickness allows the diaphragm to deflect properly upon exposure to the source of pressure to be sensed. The deflection of the diaphragm is dependent on the pressure being exerted and the thickness and size of the diaphragm. Therefore, in order to have sensors that produce a consistent response from sensor-to-sensor, the prior art diaphragm thickness must be maintained within relatively strict tolerances.

The prior art typically used one of several well known processes to etch the diaphragm, including timed-cavity-etch, oxide etch-stop, and electrochemical etch-stop.

The timed-cavity-etch process is performed by repeatedly interrupting the etching for thickness measurements and resuming etching until a specified diaphragm thickness is achieved. If a cavity is over-etched or under-etched, then the diaphragm is not the desired thickness to provide the proper structural response of the diaphragm and therefore must be discarded. Due to the constant stopping, measuring, and resuming, the process introduces many opportunities for the substrate to break, increasing the possibility of low manufacturing yields. In addition, the timed-etch process typically requires greater labor and more time than other etch techniques that employ an etch-stop layer.

Two other processes besides timed etch are available to create the sensor cavity with defined diaphragm thickness. They are oxide etch-stop using bonded wafers, also known as silicon-on-insulator (SOI), and electrochemical etch-stop. These processes have the benefit of providing a well-defined diaphragm thickness, but also have cost and processing trade-offs.

The oxide etch-stop process uses a starting material for the sensor substrate that consists of two silicon wafers bonded together, with a silicon dioxide layer in between. (The internal oxide layer is created by growing it on one of the wafers before they are bonded together.) When the cavity is etched by immersion in a chemical bath which is exposed to one surface of the bonded wafer/substrate, silicon is removed until it reaches the oxide layer which resists removal by the etchant. The diaphragm thickness is defined by precisely polishing the other surface of the wafer substrate to the desired thickness. The oxide etch stop process is simpler than timed etch, but is offset by the high cost of the bonded and polished starting material wafers used as the sensor substrate. The availability of bonded/SOI wafers is typically limited. Also, the diaphragm thickness must be pre-determined and therefore the flexibility to change pressure ranges if product mix changes is severely limited.

The electrochemical etch-stop process also provides a precise diaphragm thickness. The starting material used as the sensor substrate consists of a silicon wafer which has undergone a wafer processing step to add a P-type (in an N-substrate) or N-type layer (in a P-substrate) by means of diffusion, ion implantation, or epitaxial growth or other known process. To create a diaphragm, the wafer is etched in a fixture which applies bias to the N and P regions such that an etch stop layer is created when the chemical etchant reaches the layer which was deposited to define the desired diaphragm thickness (e.g. N epitaxial layer deposited on P substrate). Similar to the oxide etch-stop method, the diaphragm thickness must be pre-determined and sets the pressure range of the sensor well ahead of the etch process. A different diaphragm thickness requires a wafer with an N or P layer added at a different level in the wafer. The extra processing to create the etch stop layer adds cost to the wafer starting material compared to the bulk silicon wafers used in the timed etch process. Also, etch process fixturing to electrically make contact with the wafer and properly bias it to create an etch stop at the PN junction complicates the manufacturing process, and presents the potential for electrical leakage which could inhibit or damage the etch process.

Sense Multiple Pressure Ranges

At least two approaches have been used to sense pressure with a micromachined silicon diaphragm pressure sensor.

The most common (so-called "bridge" approach) involves placing four piezoresistors, one on each edge of the square or rectangular diaphragm. The piezoresistors are connected together in a wheatstone bridge configuration to sense one specific pressure range.

The other approach locates a single piezoresistive element at one edge of the diaphragm. The piezoresistive element is oriented relative to the silicon crystal structure to provide maximum sensitivity of the sensor output when it is accurately placed at the maximum stress point near the diaphragm edge.

It should be noted that when the single element approach is used, there is the potential for placing four piezoresistive sensor elements on one diaphragm/substrate. This capability has been used as part of the prior art where manufacturers will test four elements on the die and select the one which best meets performance specifications for subsequent wiring and assembly into a packaged module. However, wafer probe test time is costly, and tracking of the information regarding which sensor should be assembled introduces logistical complications and added production cost. Thus, this method has enjoyed only limited implementation, primarily in lower volume, higher cost applications.

Therefore, the need exists for a single sensor substrate having multiple sense elements that are electrically (digitally) selectable.

BRIEF DESCRIPTION OF DRAWINGS

The present invention can better be understood by reference to the drawings in which.

DETAILED DESCRIPTION OF PREFERRED EMBODIMENT

Figure 1:
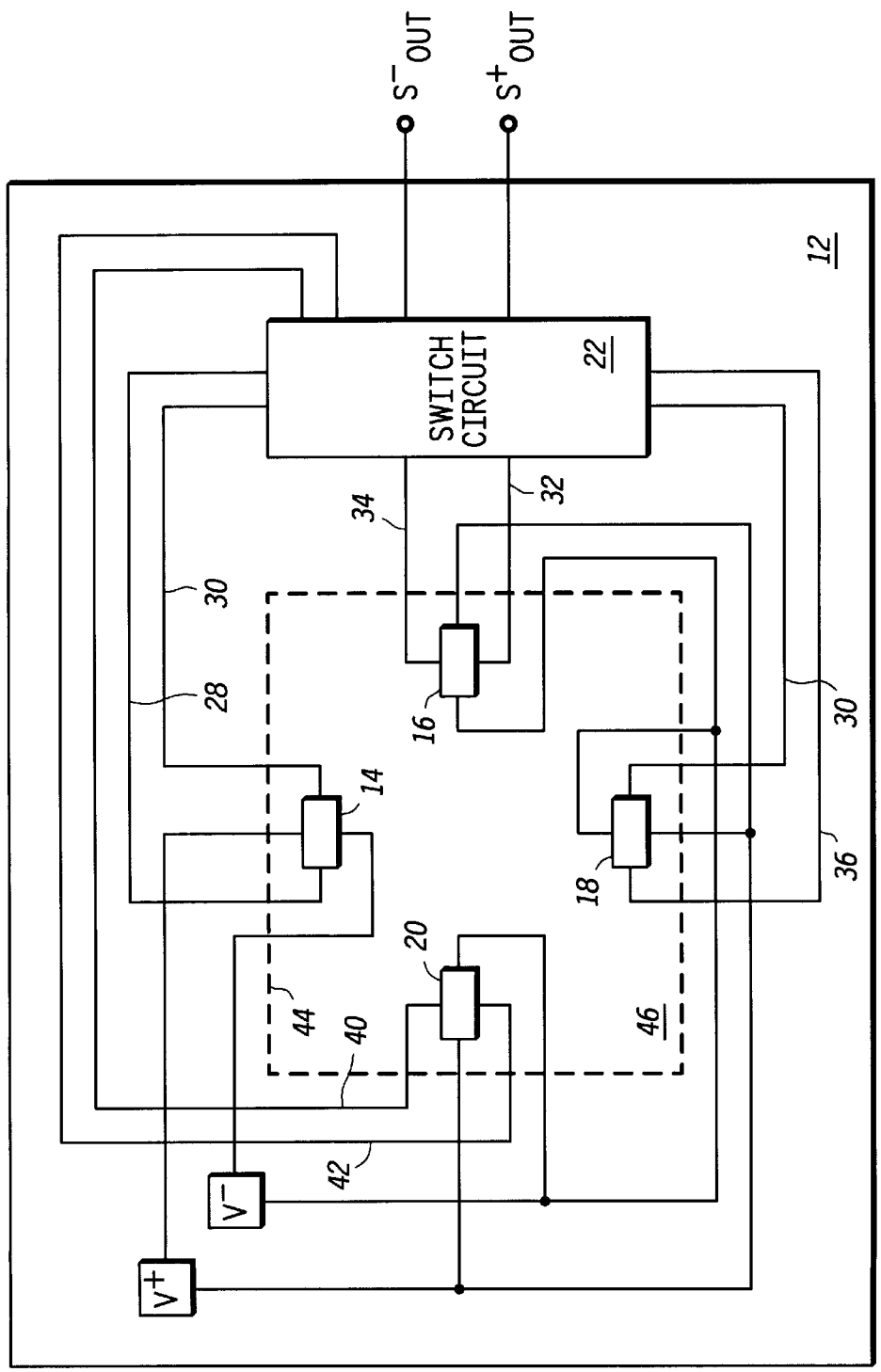
FIG. 1 is a top view of a multi-element sensor circuit in accordance with the present invention.

FIG. 1 shows a sensor 10, in accordance with the present invention. Sensor 10 includes a sensor substrate 12, sensing elements 14, 16, 18, and 20, and electronic switching circuit 22. The sensing elements 14–20 are preferably formed by implantation, diffusion, thin-film deposition, or other well known techniques.

Switching circuit 22 is electrically connected to each of the sensing elements 14–20 via lines 28, 30, 32, 34, 36, 38, 40, and 42 for electrically selecting at least one of the sensing elements 14–20. Lines 28, 32, 36, and 42 preferably carry a $S^+$ (positive sensor output) signal and lines 30, 34, 38, and 40 preferably carry a $S^-$ (negative sensor output) signal. Switching circuit 22 is preferably formed on substrate 12 by a standard semiconductor fabrication process or other well known techniques. In operation, switching circuit 22 selects the desired sensor element for measurement by electrically (digitally) connecting the $S^+$ and $S^-$ terminals of the sensor to a signal conditioning circuit which measures the differential output voltage of each defined sensing element 14–20 and amplifies and compensates the desired sensing element output signals for use by an external system. In this configuration, power ($V^+$ and $V^-$) is continuously supplied to all sensing elements 14–20. One or more sensing elements 14–20 are selected by connecting the desired output signal terminals $S^+$ and $S^-$. Other switching configurations can also be used. For example, all $S^+$, $S^-$, and $V^+$ leads could be connected to circuit 22 and then switching in the appropriate $V^-$ connection for the desired element (see FIG. 8 below). Other alternative embodiments are described in detail below.

Figure 2:
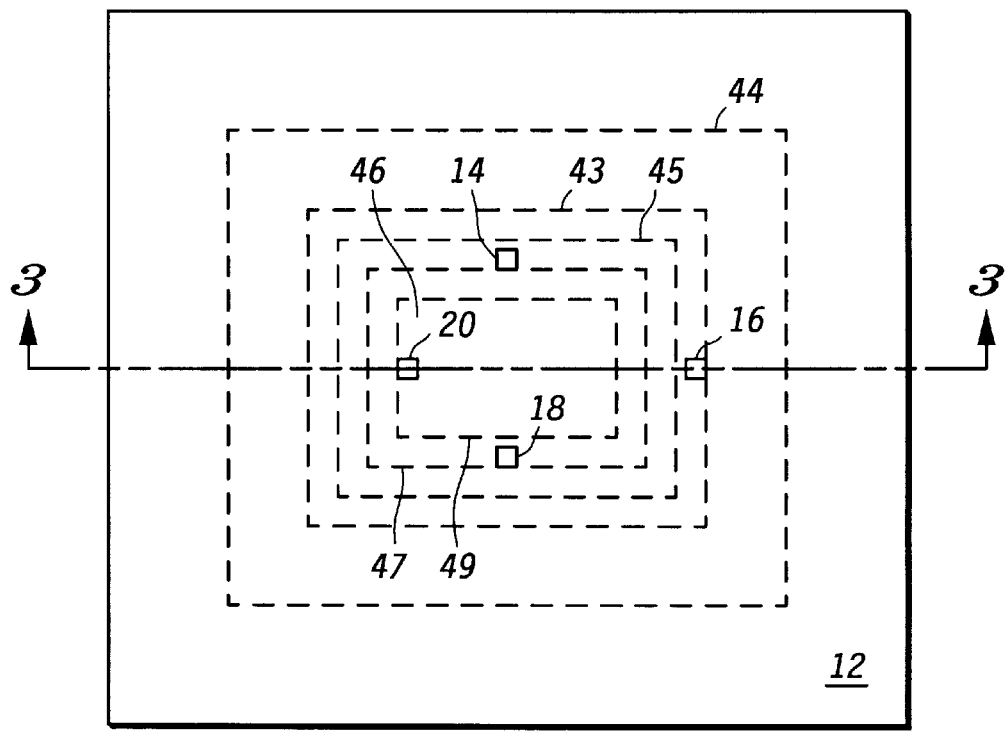
FIG. 2 is a top view of a sensor in accordance with the present invention showing multiple diaphragm sizes.
Figure 3:
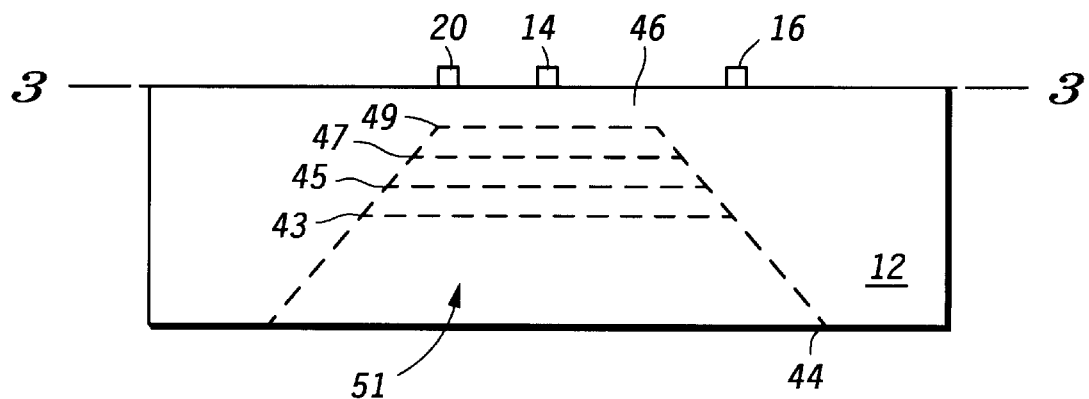
FIG. 3 is a cross-sectional view of FIG. 2 taken along line 3—3.

Sensing elements 14–20 are preferably deposed at varying distances from an outer edge 44 of a cavity 51. It is well known that sensors provide the best performance when the sensing elements are placed adjacent an edge of the diaphragm 46. Also, a sensor's sensitivity is a function of diaphragm thickness and size. By placing the elements 14–20 at varying distances from the edge 44 of the cavity opening an inexpensive timed etch method can be used. In this way, the edge of the diaphragm 46 can be formed essentially at one of the edges 43, 45, 47, and 49 as indicated in FIGS. 2 and 3. Therefore, during the timed etch process, a repeated etch and measurement cycle to measure diaphragm thickness and stop etching at a precise nominal diaphragm thickness can be minimized. This is because of the ability of the sensor 10 to operate nominally across a range of four diaphragm 46 thicknesses each corresponding to a different diaphragm edge 43, 45, 47, 49 located relative to one of the corresponding elements 14, 16, 18, 20. Thus, the etching process timing window is widened by virtue of a wider range of diaphragm thicknesses that still produce usable sensors 10. The possibility of over-etch or under-etch is reduced because of an increase in the target diaphragm thickness window.

FIGS. 2 and 3 show four possible diaphragm 46 thicknesses with corresponding diaphragm edges 43, 45, 47, and 49 defining the optimal edges of diaphragm 46 for each of the sensing elements 14–20. It is noted that each of the sensing elements 14–20 are preferably positioned on substrate 12 directly above one of the edges 43–49 for optimum performance.

In practice, using an inexpensive etching process such as a timed-etch results in the diaphragm edges 43–49 occurring at non-optimal distance from edge 44. Therefore the on-chip switching circuit 22 is needed to select the element 14–20 that provides performance closest to the nominal target.

Figure 4:
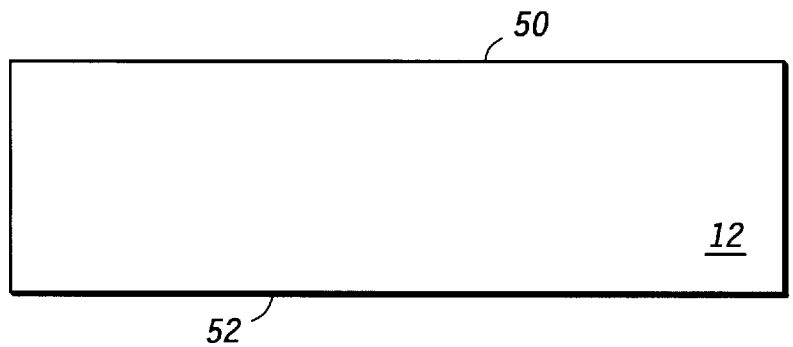
FIGS. 4–6 are cross-sectional views illustrating a method of forming a sensor in accordance with the present invention.
Figure 5:
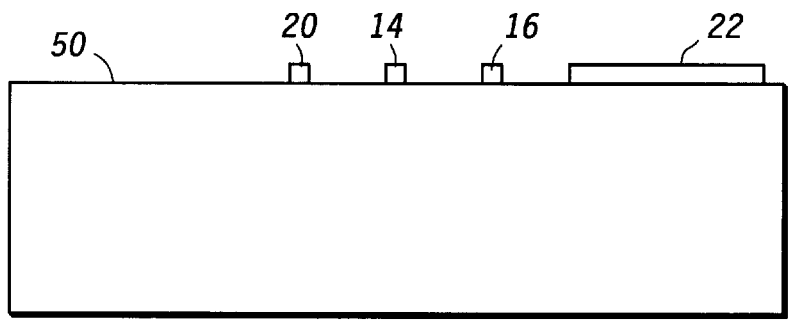
Figure 6:
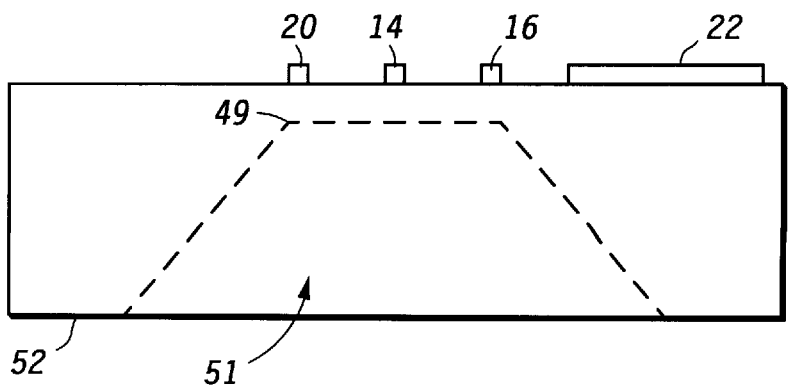

FIGS. 4, 5, and 6 are cross-sectional views of various stages of a preferred method of manufacture of the sensor 10. FIG. 4 shows the first step of the method where a sensing substrate 12 is provided and preferably made of silicon or other suitable material. Substrate 12 has a top surface 50 opposed to a bottom surface 52. FIG. 5 shows the next step of deposing sensing elements 14–20 and electronic switching circuit 22 on the top surface 50. It is noted that electrical interconnect lines 28–42 are also formed at this time but are not shown. FIG. 6 shows the final step of removing a portion of substrate 12 from the bottom surface 52 through an etching process to form a cavity 51 to form a diaphragm 46. It is noted that a timed-etch process is preferred but any etching process could be employed depending on the precision required in the placement of the elements 14–20 and the thickness of the diaphragm 46.

Figure 7:
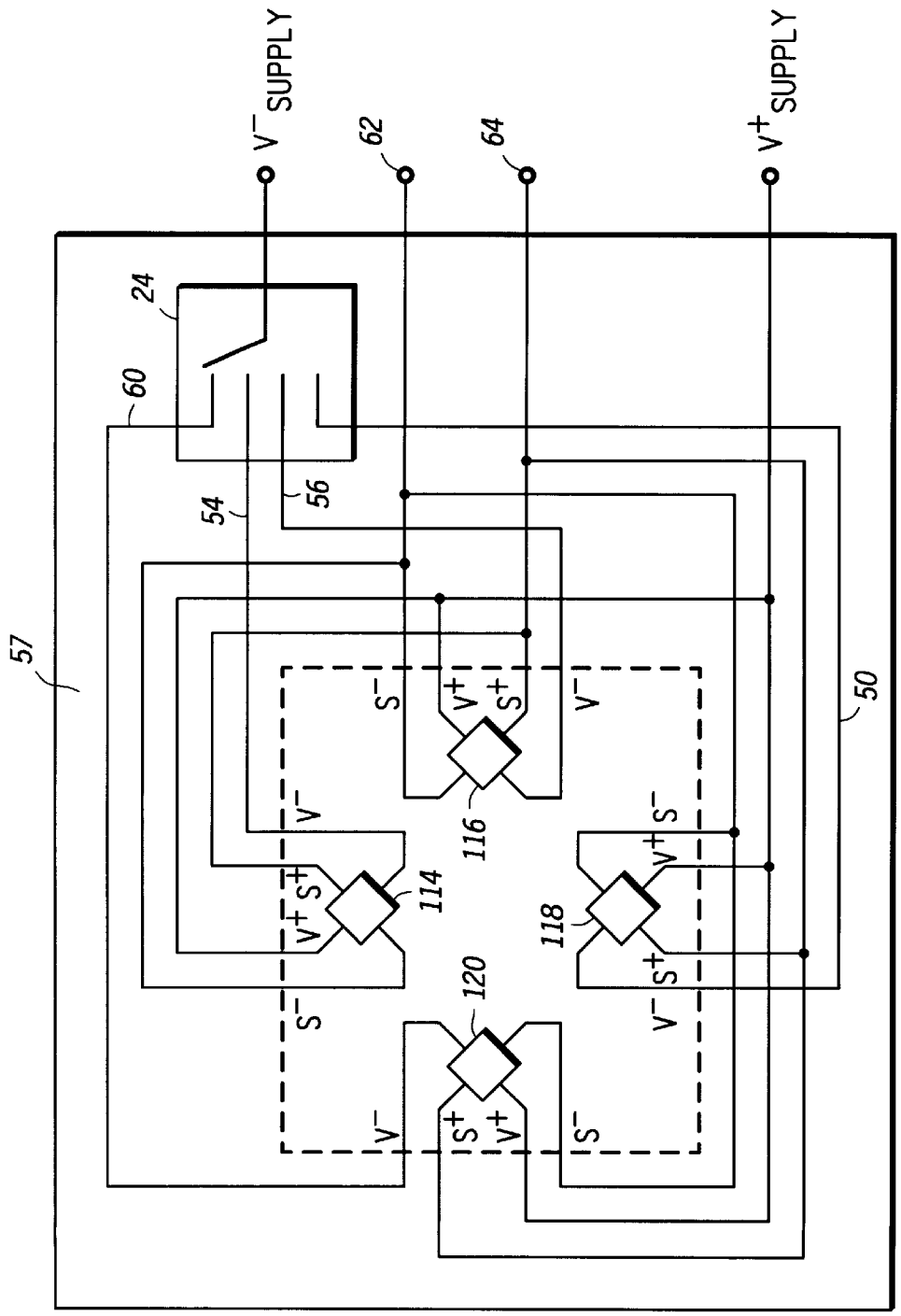
FIG. 7 is a top view of an alternate embodiment of a sensor in accordance with the present invention.

FIG. 7 discloses an alternate embodiment in accordance with the present invention. Electronic switching circuit 24 selects the desired sensing elements 114–120. The circuit 24 is preferably on-chip (monolithic), but may be off-chip as well. Sensor 55 is similar to sensor 10 described above except that sensor 55 has electronic switching circuit 24 instead of circuit 22. Circuit 24 deposed on substrate 57 has a switched electrical connection with the sensing elements via lines 54, 56, 58, and 60 as shown for electronically powering at least one of the sensing elements. In order to activate a desired sensor element, one of lines 54, 56, 58, and 60 connects the sensor $V^-$ terminal (ground terminal) to the power supply by selecting an appropriate digital code that is implemented by the switching circuit 24. This connection completes a sensor bias circuit since the other sensor connections ($V^-$, $S^+$, and $S^-$) are already hard-wired. Thus, only the desired sensor element is being measured and signal conditioned and outputting a signal, at terminals 62 and 64, to a microprocessor (not shown). Obviously, another alternative embodiment would be to switch the sensing elements 114–120 via $V^+$ power supply terminal, instead of the $V^-$ line as described above.

Figure 8:
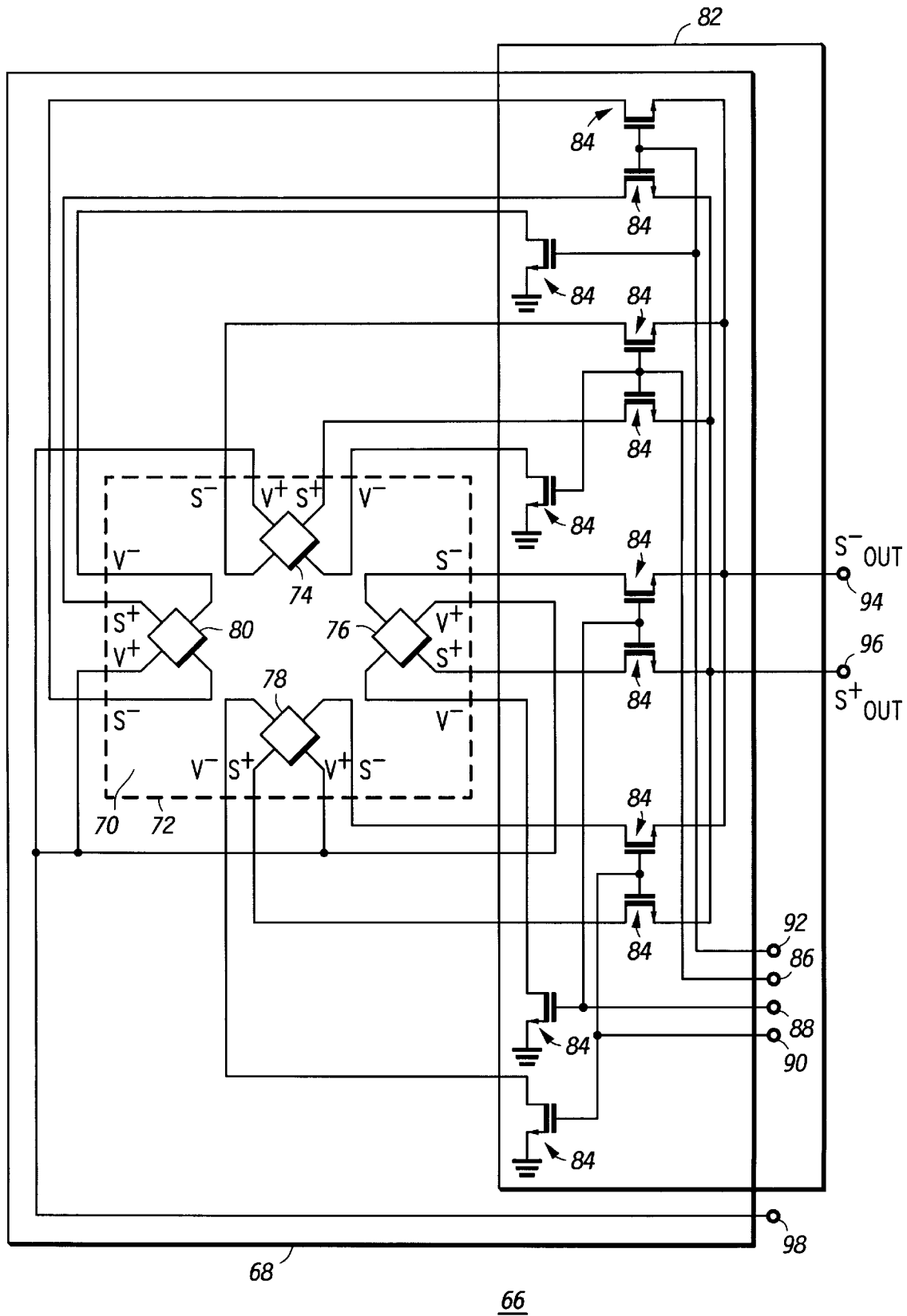
FIG. 8 is a top view of yet another alternate embodiment of a sensor in accordance with the present invention.

FIG. 8 discloses yet another preferred embodiment in accordance with the present invention. The sensor 66 includes a substrate 68, having a diaphragm 70 defined by edge 72, sensing elements 74, 76, 78 and 80, and a switching circuit defined by box 82. Switching circuit 82 includes 12 switches 84, which are preferably FETS as shown. The switches 84 are connected to one of the four input terminals 86, 88, 90, and 92.

In operation, input terminals 86–92 are connected to a microprocessor (not shown) or other logic circuitry and select the sensing element to be used. For example, if sensing element 74 is to be used, a signal would be sent through terminal 86 causing the three transistors 84 associated with the element 74 to turn on causing a signal to be outputted to terminals 94 and 96 from element 74. As can be seen, each of the elements 74–80 is always connected to the high-side voltage terminal 98. Switching the low-side power supply voltage terminal and the two output signal terminals of each element 74–80 ensures a clean signal is supplied to terminals 94 and 96. As disclosed above, the sensor can select an element by switching only the power or switching the output terminals. However, by switching both a power terminal and the output terminals, a cleaner signal at terminals 94 & 96 is caused.

Thus, has been disclosed a process for selecting one or more sensing elements on a single diaphragm by matching an "as-processed" diaphragm geometry with the best corresponding sensing element.

The technique described above selects elements to accommodate process variations in cavity etch and diaphragm edge location. The sensors can also be used to make multiple pressure sensor range die. Instead of placing sensing elements on a substrate to cover a wider range of etch conditions for a single targeted pressure range, sensing elements can be placed so that they are optimized for different pressure ranges. Each sensing element has its own target diaphragm size (cavity edge) and thickness. This may be done in conjunction with the same or different size cavity. Generally, the thicker the diaphragm 46 the higher the pressure range that will be sensed by sensor 10. In other words, a sensor 10 having a diaphragm edge corresponding with line 43 and having a thicker diaphragm will be used for a higher pressure range than a sensor 10 having a diaphragm edge corresponding to any of lines 45–49 and having a thinner diaphragm. An advantage of this invention is that only one integrated sensor design, mask set, and fabrication process is needed for the top side of the substrate. The top side of the substrate is where the complicated and costly signal conditioning and wafer processing is done. By only modifying the etch time and/or the backside cavity opening (this is only one low cost mask), four different pressure range sensors can be manufactured from the same integrated circuit wafers.

Those skilled in the art will appreciate that a sensor in accordance with the present invention will:

1) Select the best performance element out of four which have been targeted for a nominal pressure range, with allowance for the spread of process variation accounted for in the placement of the four elements.

2) Given a high degree of process capability (and thus the ability to achieve a target pressure range), one of four different pressure ranges could be manufactured from the same substrate, based on digital selection of the appropriate element. This provides significant savings in the case of a monolithic sensor with on-board signal conditioning. Otherwise, each sensor would need separate integrated circuit designs, mask sets, and manufacturing inventory, that may be cost prohibitive.

Thus, a pressure sensor and method for forming the sensor, in accordance with the present invention, has been shown and described. While the invention has been described in conjunction with specific embodiments, other variations will be apparent to those skilled in the art.

We claim:

1. A sensor comprising:

a sensor substrate;

a plurality of sensing elements deposed on the sensor substrate wherein each sensing element has at least one output signal, and an electronic switching circuit electrically connected to each of the sensing elements for electronically selecting at least one of the sensing elements wherein the electronic switch circuit includes a means for measuring the output signal to select the at least one of the sensing elements having a measured output signal corresponding to a desired output signal.

2. The sensor of claim 1 wherein the sensor is monolithic.

3. The sensor of claim 1 wherein the sensor substrate is formed of silicon.

4. The sensor of claim 1 further including structure defining a cavity having an outer edge and forming a diaphragm wherein each of the sensing elements are deposed at varying distances from the outer edge.

5. The sensor of claim 1 wherein each of the sensing elements includes a high-side terminal connected to the electronic switching circuit for electronically powering at least one of the sensing elements.

6. The sensor of claim 1 wherein each of the sensing elements includes a low-side terminal connected to the electronic switching circuit for electronically grounding at least one of the sensing elements.

7. A sensor comprising:

a sensor substrate having opposed top and bottom surfaces and presenting structure defining a cavity having an outer edge at the bottom surface and forming a diaphragm;

a plurality of sensing elements deposed on the top surface at varying distances from the outer edge and over the diaphragm, wherein each sensing element has at least one output signal; and an electronic switching circuit electrically connected to each of the sensing elements for electronically selecting at least one of the sensing elements wherein the electronic switch circuit includes a means for measuring the output signal to select the at least one of the sensing elements having a measured output signal corresponding to a desired output signal.

8. The sensor of claim 7 wherein the sensor is monolithic.

9. The sensor of claim 7 wherein each of the sensing elements includes a power terminal connected to the electronic switching circuit for electronically powering at least one of the sensing elements.

10. The sensor of claim 7 wherein each of the sensing elements includes a ground terminal connected to the electronic switching circuit for electronically grounding at least one of the sensing elements.

11. A sensor comprising:

a sensor substrate;

a plurality of sensing elements, each having a pair of power terminals and a pair of output terminals on the sensor substrate; and an electronic switching circuit electrically connected to each of the sensing elements and having a means for measuring an output signal from the output terminals wherein a switch is connected to at least on of the power terminals and to each of the output terminals of each sensing element for electronically selecting at least one of the sensing elements having a desired output signal.

* * * * *